US 6,471,904 B2

(12) United States Patent
Klaus et al.

(10) Patent No.: US 6,471,904 B2
(45) Date of Patent: Oct. 29, 2002

(54) METHOD FOR ELECTRICALLY OPERATED PLASTICS INJECTION

(75) Inventors: M. Barr Klaus, Cincinnati, OH (US); Norman L. Steffens, Loveland, OH (US)

(73) Assignee: Uniloy Milacron U.S.A. Inc., Manchester, MI (US)

( * ) Notice: Subject to any disclaimer, the term of this patent is extended or adjusted under 35 U.S.C. 154(b) by 0 days.

(21) Appl. No.: 09/770,343

(22) Filed: Jan. 26, 2001

(65) Prior Publication Data

US 2001/0005062 A1 Jun. 28, 2001

Related U.S. Application Data

(60) Division of application No. 09/248,935, filed on Feb. 12, 1999, now Pat. No. 6,193,499, which is a continuation-in-part of application No. 09/024,731, filed on Feb. 17, 1998, now Pat. No. 6,086,353.

(51) Int. Cl.[7] .............................................. B29C 45/70
(52) U.S. Cl. ................. 264/328.19; 425/557; 425/558; 425/587
(58) Field of Search ........................ 264/328.1, 328.13, 264/328.19; 425/557, 558, 560, 587, 582, 583

(56) References Cited

U.S. PATENT DOCUMENTS

| | | | | |
|---|---|---|---|---|
| 4,758,391 A | * | 7/1988 | Shimizu et al. .......... 264/328.1 |
| 5,286,187 A | * | 2/1994 | Niimi et al. ................. 425/205 |
| 5,645,868 A | * | 7/1997 | Reinhart ...................... 425/145 |
| 5,863,567 A | * | 1/1999 | Klaus .......................... 425/145 |
| 5,925,295 A | * | 7/1999 | Nakamura et al. ..... 264/328.19 |
| 6,086,353 A | * | 7/2000 | Klaus .......................... 425/145 |
| 6,193,499 B1 | * | 2/2001 | Klaus et al. ................. 425/557 |
| 6,200,127 B1 | * | 3/2001 | Klaus .......................... 425/557 |

\* cited by examiner

Primary Examiner—Jill L. Heitbrink
(74) Attorney, Agent, or Firm—Stephen H. Friskney

(57) ABSTRACT

A two-stage, electrically-powered injection unit for an injection molding machine includes an extruder for plasticating material, and a separate melt accumulator to receive the plasticated material. The accumulator includes an injection plunger that is slidably positioned to inject the plasticated material from the accumulator into a mold. The plunger is rotated and translated by an electrically-driven linear actuator, such as a roller screw mechanism. The plunger extends outwardly of the accumulator barrel at the commencement of an injection stroke and is peripherally supported by a bushing at the outer end of the accumulator barrel. The outwardly-extending portion of the plunger can also be supported by a movable intermediate support member to minimize lateral deflection of the plunger and enable a longer injection stroke to be employed. The injection pressure imposed upon the plasticated material can be varied from a relatively low initial injection pressure, to minimize lateral deflection of the plunger, to a relatively higher injection pressure as the length of the portion of the plunger that extends outwardly of the accumulator barrel decreases.

6 Claims, 11 Drawing Sheets

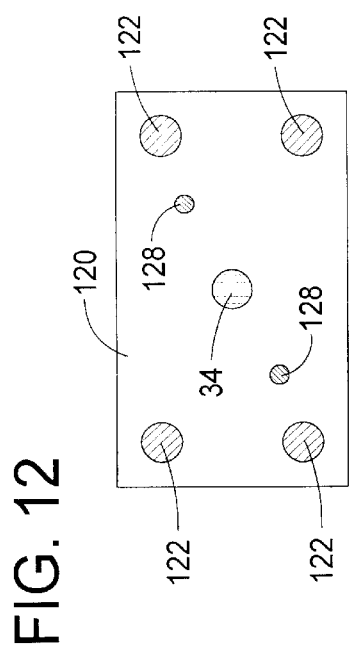
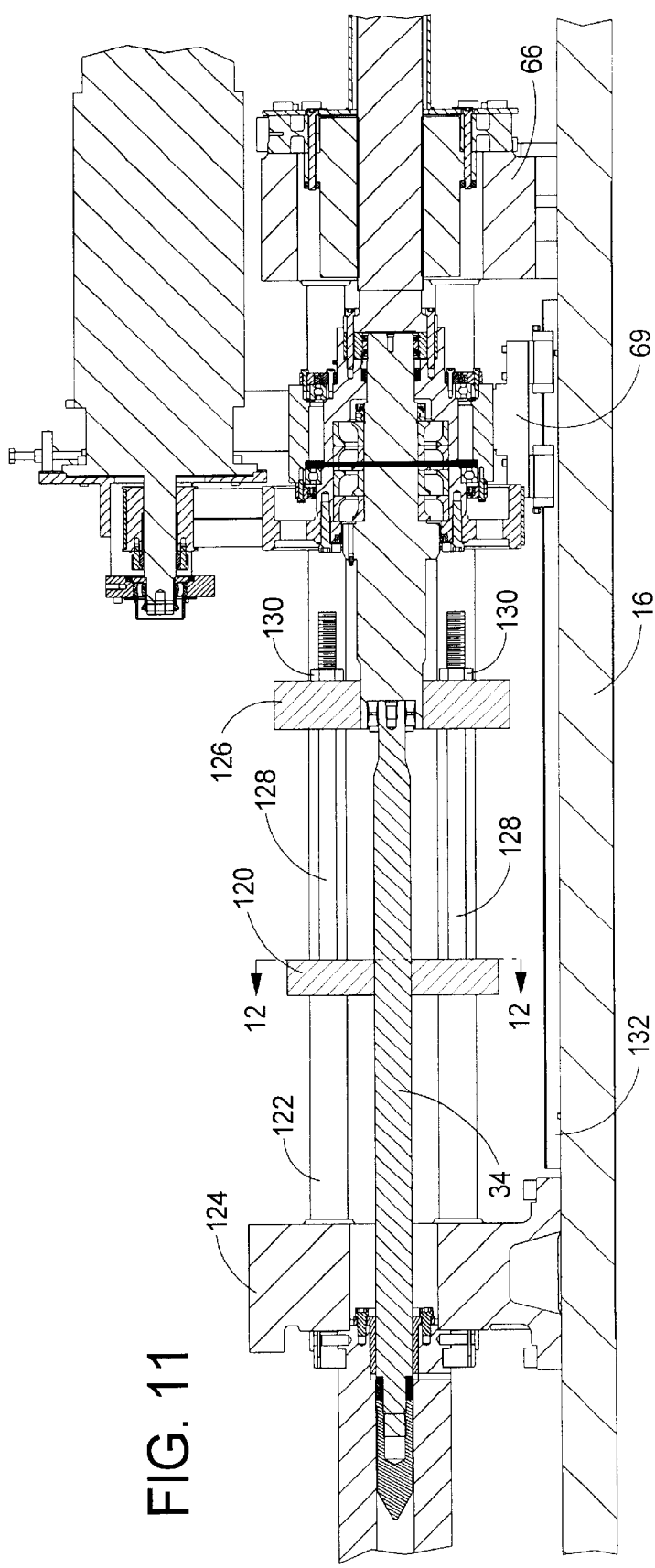
FIG. 12
FIG. 11

METHOD FOR ELECTRICALLY OPERATED PLASTICS INJECTION

CROSS-REFERENCE TO RELATED APPLICATIONS

This application is a division of pending application Ser. No. 09/248,935, filed Feb. 12, 1999 now U.S. Pat. No. 6,193,499, which is a continuation-in-part of application Ser. No. 09/024,731, filed Feb. 17, 1998, which issued as U.S. Pat. No. 6,086,353 on Jul. 11, 2000.

BACKGROUND OF THE INVENTION

1. Field of the Invention

The present invention relates to injection molding machines. More particularly, the present invention relates to a two-stage, electrically-operated injection molding machine wherein plastication is performed in a first processing stage and injection is performed in a second processing stage that is separate from the first stage.

2. Description of the Related Art

The injection unit of an injection molding machine provides essentially two functions during the course of a normal operating cycle: namely, plastication of the molding material, followed by injection of the material into a mold cavity. In a reciprocating screw injection molding machine, sometimes referred to herein as a "single-stage machine," both the plastication and the injection of the molding material are performed by the same apparatus. The plastication function is accomplished by introducing plastic material in pelletized form, and rotating the plastication screw within a heated barrel. The plastic material is heated and worked until it becomes molten and is transported by the screw in a generally helical direction toward the forward end of the screw. The molten material moves toward the forward end of the screw to exert a rearward pressure or force on the screw that serves to move the screw axially within the barrel, away from the forward end of the barrel. When the desired quantity of molten plastic material has been accumulated at the forward end of the screw, an amount commonly referred to as a "shot", the retracted plastication screw is moved rapidly forward, without rotation, to inject the molten molding material into a mold cavity defined by a closed mold to form a desired molded part.

A molding machine can also be provided wherein the plastication and injection functions are performed by separate elements of the machine. In such a machine, sometimes referred to herein as a "two-stage machine," the plastication function is still performed by a plastication screw that is rotated within a heated barrel, but the screw is not axially shifted to define the shot and to inject the shot into the mold cavity. Instead, the molten plastic material is caused to flow into a separate and distinct accumulator that is usually positioned adjacent the plastication barrel. When the desired amount of molten molding material has been received within the cylindrical barrel of the accumulator, a ram or plunger carried within the barrel is moved axially to inject the molten plastic melt from the accumulator into the mold cavity.

The advantages of a two-stage injection unit include more uniform plastication of the molding material, reduced wear of the plastication screw and plastication barrel, and the potential for higher injection pressures than are attainable in a single stage machine. The primary disadvantages of the two-stage injection unit are higher equipment cost and the tendency for some uninjected material to remain within the accumulator barrel as carryover material. Because the carryover material can be subjected to high temperatures for a longer time period, thermal degradation of the carryover material can occur, which can adversely affect the quality of the molded part.

In recent years, electric motors have been employed in place of hydraulic motors, as the direct power source for some reciprocating screw injection units. Electrically-operated systems have sometimes utilized separate motors for each function of the molding material injection unit: one motor solely for rotating the feed screw for plastication, and a second, separate motor coupled with a mechanical mechanism, such as a ball screw, roller screw, rack and pinion or similar device, to convert the rotary motion of the second motor into the linear motion required to move the screw axially for injection. Electric motors driving screw mechanisms can also be used as power sources in machines having two-stage injection units.

Drive systems based upon electric motors and ball screws, for example, have their practical limits. For example, the larger diameter ball screws required to provide the necessary high injection pressures for larger sized parts are quite expensive. In addition, since the availability and cost of ball screws are affected more by ball screw diameter rather than by length, ball screws in excess of six inches in diameter are virtually unavailable in commercial quantities, which has severely limited the maximum capacity of an all-electric injection unit to about a 40 ounce shot size. Although a large diameter ball screw can be replaced by two smaller diameter ball screws operating in tandem, the cost for plural ball screws and associated components is also quite high. In fact, the construction of electric reciprocating screw injection units that have capacities to match the range of shot sizes of commercially available hydraulically-powered units would also be very high cost for other, similar drive mechanisms, such as roller screws or rack and pinion. Furthermore, large capacity units would require ball screws of diameters that are untested and that, in fact, exceed current ball screw manufacturing capabilities. Similar problems are incurred with alternative rotary to linear motion converters that could be used to drive a reciprocating screw.

Accordingly, it is an object of the present invention to provide an improved drive apparatus for an injection molding machine having a two-stage injection unit.

It is another object of the present invention to provide a two-stage injection unit that is electrically-powered, that is simple in construction, and that has no practical limits (upper or lower) on shot capacity.

SUMMARY OF THE INVENTION

Briefly stated, in accordance with one aspect of the present invention, injection apparatus for an injection molding machine is provided. The apparatus includes an extruder or plastication unit having a helical screw rotatably carried within a barrel for plasticating molding material. A melt accumulator is spaced from, but is in communication with the plastication barrel for receiving plasticated molding material. The barrel of the accumulator includes a plunger slidably and rotatably carried therewithin, the accumulator barrel having an inner diameter and a forward end through which molding material is injected. The accumulator barrel also has a rearward end through which the plunger extends, and the plunger has a forward end within the accumulator barrel and a rearward end that extends outwardly from the rearward end of the accumulator barrel. Electrically-powered plunger drive means are connected with the rearward end of the plunger for translating and rotating the plunger within and relative to the accumulator barrel. A support bushing is carried at the rearward end of the accumulator barrel and surrounds and engages with the plunger for providing support for the plunger. Alternatively, support for the plunger can be provided by a movable support plate.

In accordance with another aspect of the present invention a method of supplying molding material to a mold cavity under pressure is provided. The method includes plasticating a quantity of molding material in a plastication barrel. The plasticated molding material is conveyed from the plastication barrel to a separate tubular accumulator barrel containing a plunger capable of axial sliding movement. The plunger includes an external helical ridge extending along a portion of the length of the plunger and adjacent a forward end of the plunger. The plunger is simultaneously rotated and translated as molding material is supplied to the accumulator. The plunger is then moved forward without rotation during an injection stroke to inject the molding material through an outlet at one end of the accumulator barrel and into a mold cavity at a predetermined injection pressure. The rotation and translation of the plunger are effected by an electric-motor-powered drive system.

BRIEF DESCRIPTION OF THE DRAWINGS

FIG. 11 is a fragmentary, side elevational view, partially in cross section, of another embodiment of the present invention that includes a plunger support plate that moves together with a movable traverse platen.

FIG. 12 shows the plunger support plate of the embodiment shown in FIG. 11, as viewed along the line 12—12 of FIG. 11.

DESCRIPTION OF THE PREFERRED EMBODIMENTS

Figure 1:
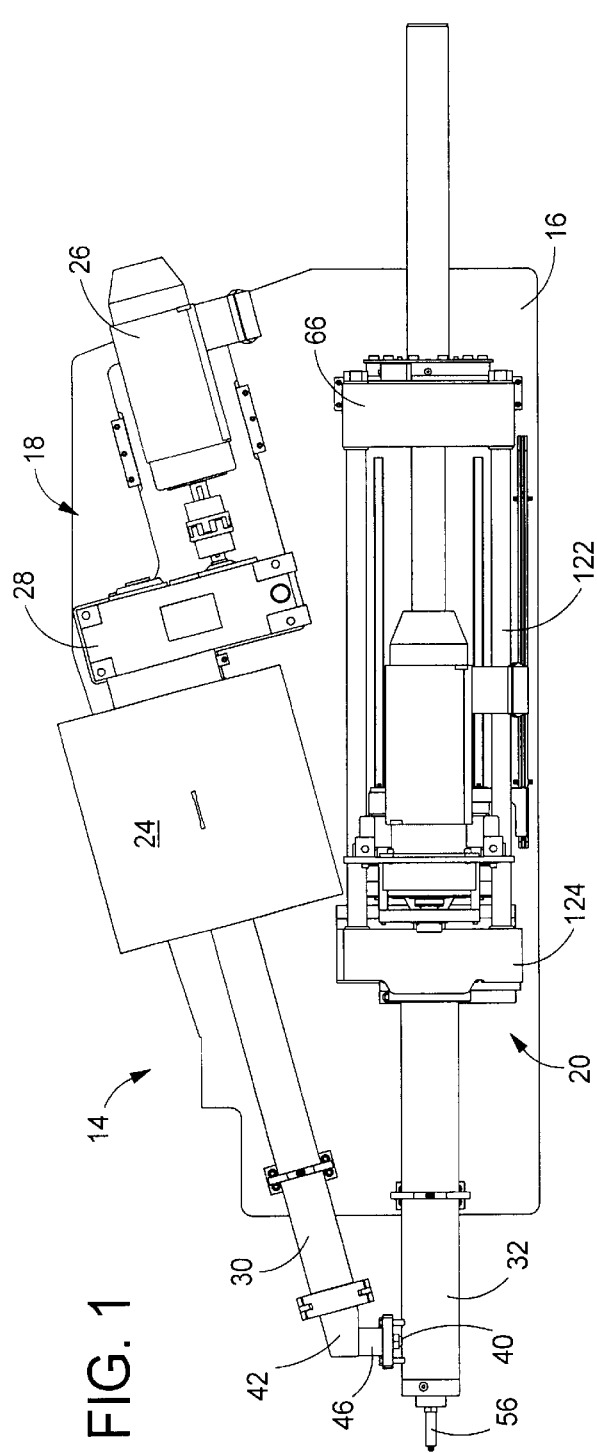
FIG. 1 is a top view of a two stage, electrically-powered injection unit in accordance with the present invention.
Figure 2:
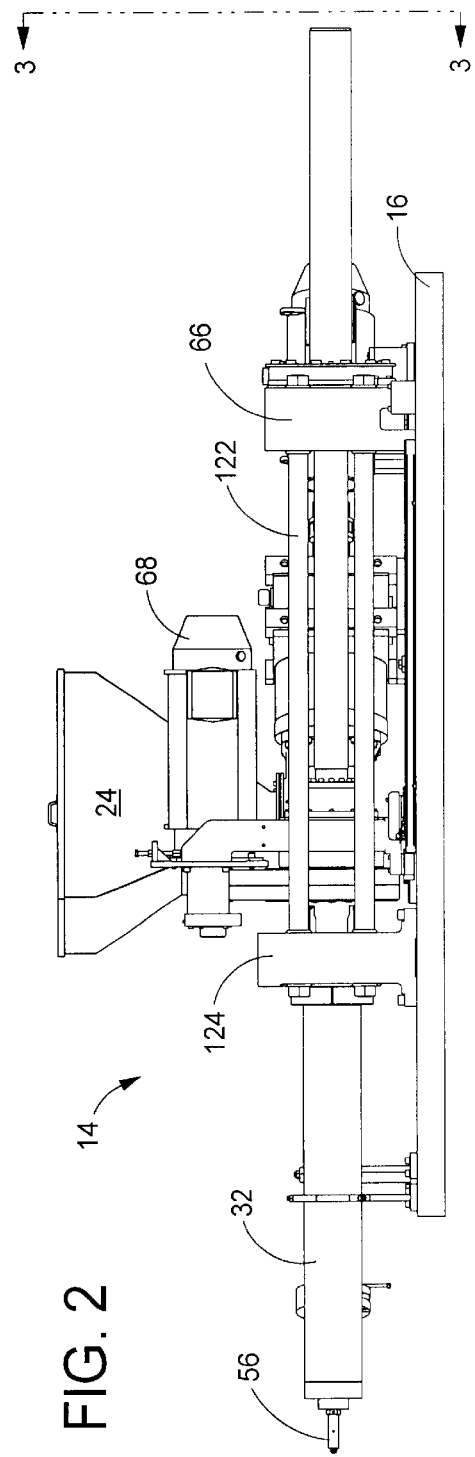
FIG. 2 is a side view of the two stage injection unit as shown in FIG. 1.

Referring now to the drawings, and particularly to FIGS. 1 and 2 thereof, there is shown a two-stage injection unit 14 mounted on an elongated support or base 16. Injection unit 14 includes an extruder or plastication unit 18 and a melt accumulator 20.

The plastication unit 18 is intended for plastication of material and, as shown in FIG. 2, it includes a barrel 30 and a feed screw (not shown). Because the plastication unit 18 serves only to plasticate the molding material, the feed screw rotates but does not reciprocate axially within the barrel 30 as would occur in a conventional single stage injection unit. If desired, however, the structures herein disclosed in the context of the present invention can also be incorporated into a two-stage injection system having a reciprocating screw.

As is generally known in the art, solid molding material is supplied to the plastication unit 18 in pelletized form at the upstream end thereof, such as from a feed hopper 24. The rotational power for the plastication screw is provided by an electric motor 26, connected to the feed screw through a speed reduction gearbox 28 to rotate the screw within the barrel 30. Because the feed screw only rotates and does not move axially, the drive system for the injection unit illustrated and described herein is greatly simplified over the drive system necessary for injection units having a screw that must reciprocate as well as rotate.

Figure 4A:
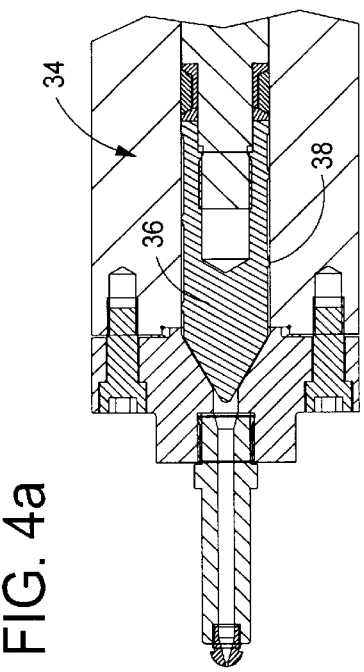
FIG. 4a is an enlarged view of the portion of the cross section shown in FIG. 4 encircled at A, showing the matching configuration of the plunger tip and the end of the accumulator barrel in accordance with the present invention.
Figure 4:
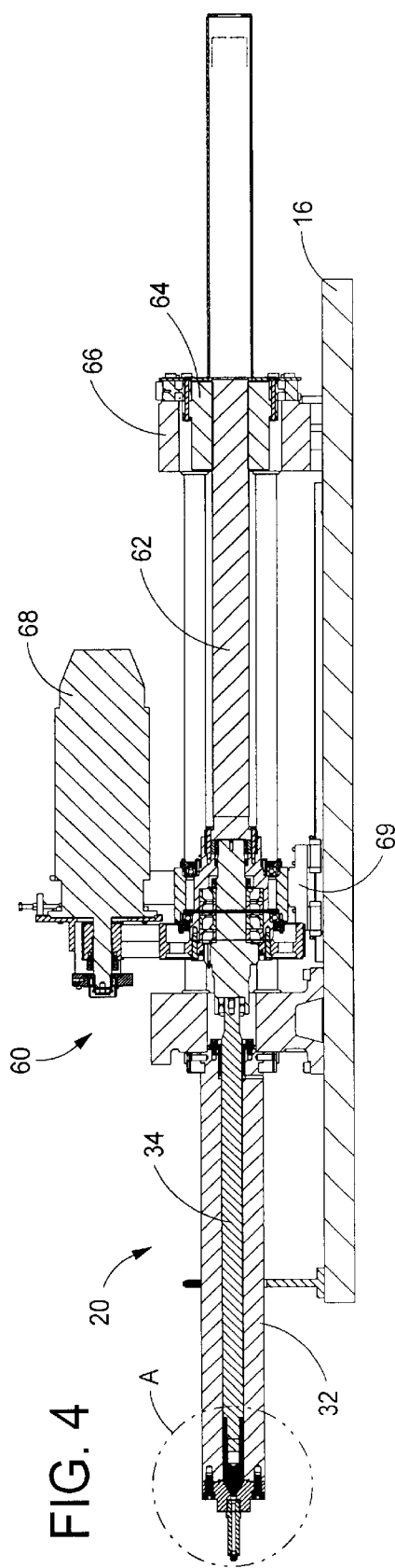
FIG. 4 is a cross sectional view of the melt accumulator of the two-stage injection unit of the present invention, taken along the line 4—4 of FIG. 3.

As better seen in FIGS. 4 and 4a, the melt accumulator 20 includes a tubular barrel 32 within which a cylindrical plunger 34 is slidably carried. The plunger 34 is capable both of rotation as well as linear movement axially within the barrel 32. The plunger 34 preferably includes a head 36 having a helical flight 38, which, when the plunger 34 is rotated, serves to convey plasticated molding material in a direction toward the forward tip of the plunger head 36. Thus, rotating the flighted head 36 serves to simulate the action of a plasticizing screw in a reciprocating screw injection unit. This provides a "first in, first out" conveying of molding material that enters the barrel 32 of the accumulator 20. Conveying the material to the mold in this manner reduces the likelihood of material carry-over from shot to shot, and the possibility of degradation due to excessively long exposure of the material to elevated temperatures.

Also, from the standpoint of reducing the amount of material remaining in the accumulator barrel 32 after an injection stroke (carry-over), it is desirable that the shape of the forwardmost inner end of the barrel 32 and the forwardmost end of the plunger 34 are each similarly configured, see FIG. 4a. This type of construction essentially displaces the entire shot volume and thus minimizes the amount of plasticated material remaining within the barrel 32 after the plunger 34 has completed its injection stroke.

The inner diameter of the barrel 32 and the outer diameter of the plunger head 36, as well as the length of stroke of the plunger 34 within the barrel 32, can be varied to change the shot size. Appropriate changes in these elements enable the accumulation within the barrel 32 of the necessary volume of molding material to fill a particular mold cavity (not shown). The size relationship between the plunger head 36 and the drive mechanism is such that the diameter of plunger head 36 dictates the load carrying requirements for the mechanism that converts the rotary motion of the electric drive motor into linear motion for moving the plunger 34 axially during the injection stroke.

In sizing the components of the melt accumulator 20, the advantages of the present invention are more fully realized when the ratio of the full (maximum) length of stroke for the plunger 34 to the diameter of the plunger head 36 (the L/D) is five or higher. It has also been determined that L/D ratios from about fifteen to twenty-five, and even higher, are particularly advantageous in extending the capacity of electrically-powered, two-stage machines and economically enabling the molding of larger size parts. Using these "long stroke" plungers in electrically-powered injection molding machines allows use of commercially available drive mechanisms, and makes it possible to improve shot size accuracy and repeatability, while running at higher injection pressures. In that regard, a two-stage injection unit having a 2.75 in diameter plunger and designed in accordance with the present invention, can provide a shot capability of about 150 oz., operate at an injection pressure of up to 20,000 psi and be driven by a conventional screw mechanism. In contrast, prior art all-electric injection molding machines having a similarly sized reciprocating screw would typically have a maximum shot capacity of only about 30 oz.

The outlet of the plastication unit 18 communicates with the accumulator 20 by means of a suitable conduit 42 that extends from the forward end of the barrel 30 and terminates at an accumulator barrel material inlet 40. At a convenient point between the plastication unit 18 and inlet 40, such as within the conduit 42, for example, a ball check valve 46 or other suitable non-return device can be provided to control the direction of the flow of molding material within the conduit 42. Accordingly, when the plunger 34 is actuated to inject molten material from the accumulator 20 into a mold cavity and to maintain pressure on the molding material during the pack and hold portion of a molding cycle, the check valve 46 prevents the backflow of molding material from the accumulator 20 into the conduit 42 and into the plastication unit 18. Closure of the check valve 46 also serves to maintain the desired injection pressure on the molding material during the injection stroke as well as during the mold packing portion of the molding cycle. The discharge end of the accumulator 20 can be connected with an injection mold (not shown) by a suitable nozzle 56, or the like.

Figure 3:
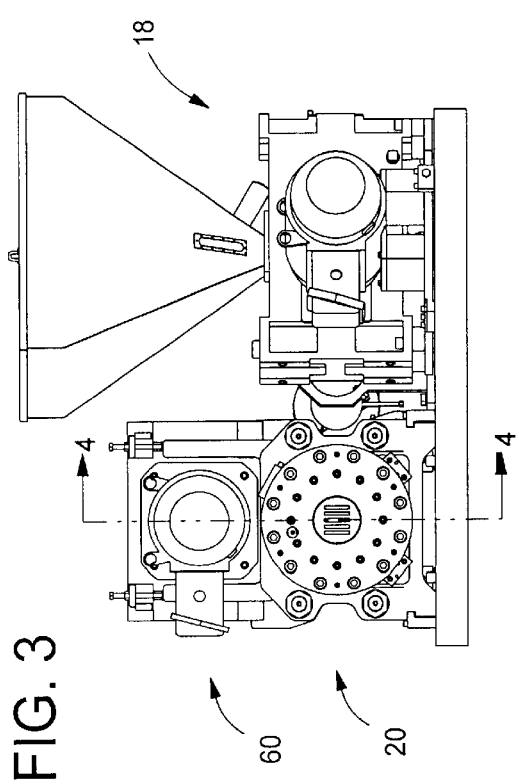
FIG. 3 is an end view of the two stage injection unit of the present invention, taken along the line 3—3 of FIG. 2.
Figure 5:
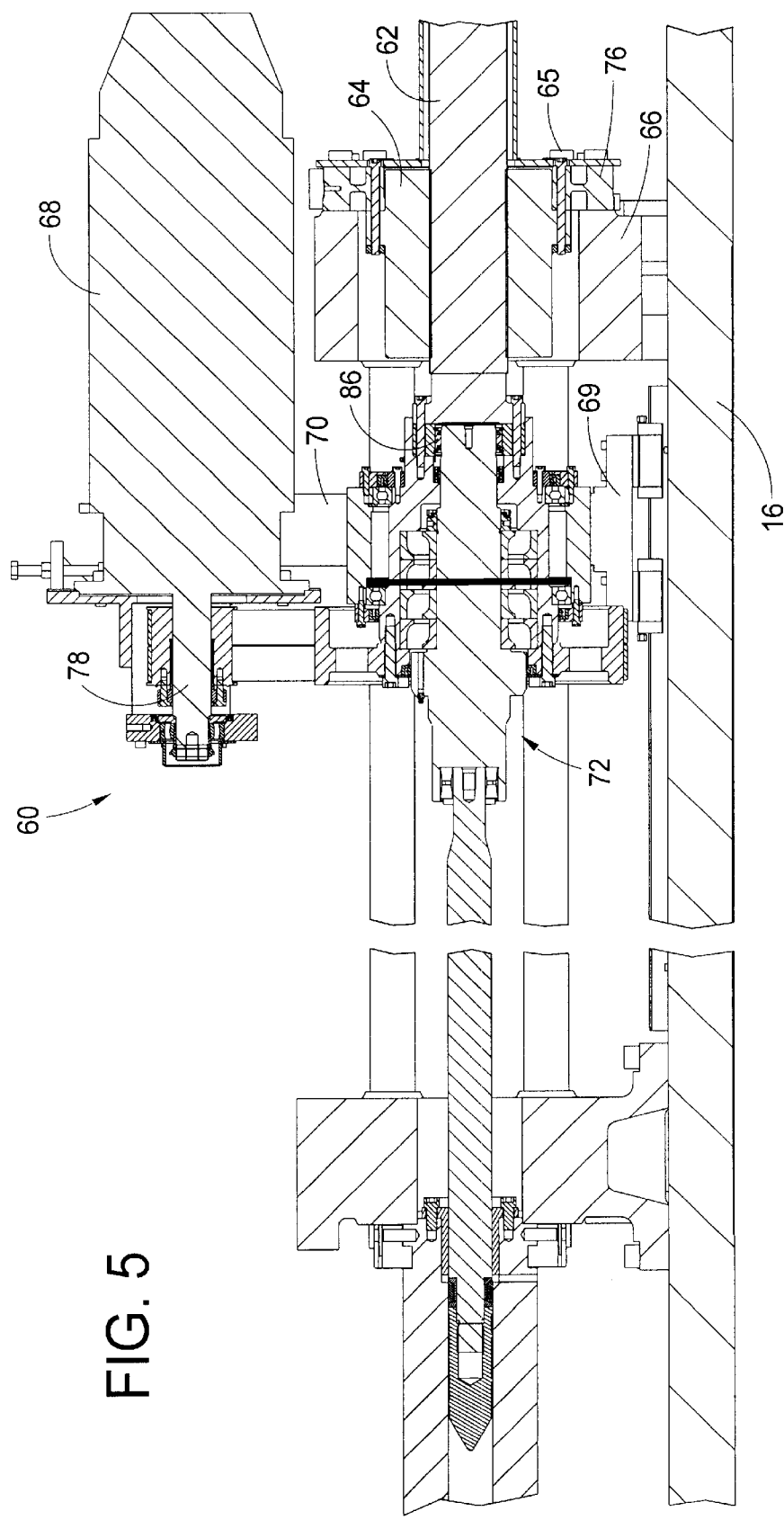
FIG. 5 is an enlarged, fragmentary view of the cross section shown in FIG. 4, showing in greater detail the barrel, plunger, and mechanical drive elements associated with the melt accumulator of the two-stage injection unit of the present invention.

The plunger 34 of the accumulator 20 is preferably actuated by an electro-mechanical drive assembly 60, as shown in FIGS. 3, 4 and 5. The drive assembly 60 preferably includes a roller screw 62 that is axially aligned with the plunger 34. The roller screw 62 is rotatably carried within a roller nut 64 that is, in turn, carried by a stationary support housing 66. Rotation of the roller screw 62 is effected by a variable speed electric motor 68 mounted on a motor support 70 that is linearly slidably carried on a support platen 69 that is mounted to the base 16 to allow for linear movement of the motor 68 relative to the support housing 66.

As shown in FIG. 5, the roller nut 64 is restrained from joint rotation with the roller screw 62 by the attachment of the nut 64 to the housing 66 through suitable means, such as bolts 65. Additionally, a load cell 76 can be positioned between the roller nut 64 and support housing 66 to monitor the axial load that is applied to the roller screw 62 and to the plunger 34.

The driven end of the roller screw 62 is drivingly connected with the output shaft 78 of the motor 68 (see FIG. 5). The opposite, forwardmost end of the roller screw 62 is drivingly connected with the plunger 34 of the accumulator 20 by means of a suitable drive coupling 72. Preferably, the drive coupling 72 includes a one-way clutch 86 that allows the roller screw 62 to rotate freely with respect to the plunger 34 during the injection stroke of the plunger 34 (to provide clockwise rotation of the roller screw 62 when viewed from the motor 68), and thereby transmit efficiently a linear force from the roller screw 62 to the plunger 34 without adversely affecting the melt contained within the accumulator 20. Reverse rotation of the roller screw 62 (counter-clockwise when viewed from the motor 68) engages the one-way clutch 86 causing the plunger 34 to rotate within the barrel 32 so that helical flight 38 on the plunger head 36 can urge the remaining molding material within the barrel 32 in a forward direction, toward the nozzle 56. This action minimizes the carry-over of material from shot-to-shot and thereby minimizes thermal degradation of molding material that would otherwise be retained.

Because the motor 68 is coupled directly with the roller screw 62, the motor 68 must be able to move axially with the roller screw 62 as it moves the plunger 34 within the barrel 32. Accordingly, the motor support 70 is so configured as to provide stability for the motor 68 while allowing the motor to move linearly in the direction of movement of the plunger 34.

A cycle of operation of an injection molding machine incorporating the two-stage injection unit 14 in accordance with the present invention will now be described. The plastication screw is rotated within the barrel 30 by the motor 26 to begin plastication of the solid material supplied from the hopper 24 that is to be conveyed to the accumulator 20 as molten plastic material. The rotation of the plastication screw causes molten molding material to be carried within the barrel 30 and toward the conduit 42. The pressure of the moving molding material causes the ball check valve 46 to open and enable molten molding material to flow through the conduit 42 and into the accumulator 20.

The inlet 40 of the accumulator 20 is positioned relative to the barrel 32 so that molding material flowing into the barrel 32 will pass over the flight 38 on the plunger head 36. The incoming molding material flows along flight 38, carrying ahead of it any molding material remaining from the previous shot and moving it toward the outlet end of the barrel 32. As more molding material enters the barrel 32, the pressure in the accumulator 20 gradually increases. When the pressure of the molding material within the accumulator 20 reaches a certain level, the accumulating molding material will begin to force the plunger 34 rearwardly, so that the roller screw 62 and the motor 68 move axially toward the rear of injection unit 14. Because support housing 66 remains stationary, the rearward movement of the screw 62 through the nut 64 causes the roller screw 62 to rotate in a reverse direction (counter-clockwise as viewed from the motor 68). This reverse rotation of the roller screw 62 is imparted to the plunger 34 via engagement of the one-way clutch 86. The rotation of the plunger 34 further aids in cleaning preexisting, carry-over material from the flight 38 by enhancing the wiping action of the inflow of new melt.

If desired, the rate of rearward movement of the plunger 34 (and of the roller screw 62) can be controlled by the operation of the motor 68. In that regard, the motor 68 can be employed as a brake to impede the rotation of the roller screw 62, which slows the rearward movement of the plunger 34, thereby increasing the back pressure acting on the molding material within the accumulator 20. Alternatively, the motor 68 can be operated to increase the speed of rotation of the roller screw 62, and consequently the speed of its rearward movement, which increases the rate at which the plunger 34 moves back, thereby decreasing the back pressure on the melt. In either case, the rotational speed of the roller screw 62 is imparted to the plunger 34 by the clutch 86.

The plastication function is complete and rotation of the feed screw is stopped when a sufficient volume of molten molding material has been received within the accumulator 20 and in front of the plunger 34 as is required to fill a mold cavity. Concurrently with the plastication function, the clamp unit (not shown) of the injection molding machine has been operated to close the mold (not shown) and to build holding pressure on the mold before the high pressure injection of the molding material.

To initiate the injection function, the motor 68 is energized to cause the roller screw 62 to rotate in a clockwise direction (as viewed form the motor 68) to advance the roller screw through the roller nut 64 which is securely held by the support housing 66. The translational (linear) movement of the roller screw 62 is imparted to the plunger 34 through the coupling 72. However, the rotation of the roller screw 62 is not imparted to the plunger 34 since the one-way clutch 86 is disengaged when the roller screw 62 rotates in the clockwise direction. Given the construction of the drive assembly 60, the motor 68 will also translate along with the roller screw 62 as the plunger 34 is moved linearly within the barrel 32 of the accumulator 20 toward the nozzle 56.

The forward movement of the plunger 34 causes the accumulated plastic melt to be forced through the nozzle 56 and into the mold cavity (not shown). The injection pressure generated on the molding material within the barrel 32 by movement of the plunger 34 toward the nozzle 56 causes the ball check valve 46 to move to a position that closes the conduit 42 and prevents return of the molding material into the plastication unit 18. After the bulk of the molding material is injected into the mold cavity, force is maintained on the plunger 34 by operation of the motor 68, thereby maintaining the proper packing and holding pressure on the molding material until the material has sufficiently solidified and the molded part is properly formed. When the plunger 34 reaches the "hold" portion of the cycle, the accumulator 20 has been substantially emptied of molding material. At that point in the injection molding operating cycle the parts of the injection system are in the relative positions shown in FIG. 4, wherein the plunger 34 of the accumulator 20 is fully forward within the barrel 32, having completed the injection function.

As part of the injection process, it is highly desirable to avoid "dead" spots in the material flow path where plastic melt can remain stationary through repeated cycles, allowing it to degrade, possibly later mixing with good material and injected to form a poor quality part. Accordingly, a complementary mating configuration between the plunger head 36 and the interior at the outlet of the barrel 32 will serve to minimize the amount of material remaining in the accumulator 20 after the shot is completed. The only significant carry-over material is in the flight 38 of the plunger head 36, and that material is swept from the flight 38 by the inflow of new melt and the rotation of the plunger 34 as the subsequent shot of material is accumulated and is injected into the mold during the next cycle of operation.

After sufficient hold/cool time, the pressure maintained on the molding material by the plunger 34 is released during mold decompress, which may include a slight retraction of the plunger 34. The clamp unit can then operate to open the mold, eject the part(s), then re-close to begin a subsequent cycle, as required for a particular application. After the injection hold time is completed, at some point during the cooling time, the plastication unit 18 starts rotation of the feed screw to initiate the plastication function as described previously, and to begin another cycle of operation.

Because of the maximum diameters of commercially available screw mechanisms, which serve to limit the diameter of the plunger 34, larger shot size capacities can be provided by increasing the length of the injection stroke of the plunger. Although the shot size can be further increased by increasing the length of the injection stroke, while maintaining the maximum plunger diameter dictated by the screw size limitation, the stroke length variable is not without its own limitation. In that regard, as the length to diameter ratio (L/D) of the plunger is increased, to provide larger shot sizes, and as the injection pressure is increased, to more rapidly fill the larger capacity mold cavities in order to assure complete filling of the mold before significant cooling of the molding material has occurred, the additional axial column load imposed on the plunger during the injection stroke could result in undesired bending of the plunger.

One way to minimize bending caused by column loading on an elongated, higher L/D plunger is to provide support for the plunger adjacent the upstream end of the accumulator barrel. Such support can be provided in the form shown in FIG. 6. As shown, the open, upstream end 80 of the barrel 32 includes an inner annular recess 81 to receive an annular support bushing 82 within the end 80 of the barrel 32. The bushing 82 has an inner annular opening 84 to support, axially and slidably, the plunger 34, and has a sufficient inner axial length to define a cylindrical supporting surface for the plunger 34. Accordingly, the head 36 of the plunger 34 that includes the flight 38 and end land 90 is supported by the inner surface of the barrel 32, and an intermediate portion of the plunger 34 is supported by the bushing 82. Because of the axial length of the barrel 32, the two spaced plunger support points, i.e., the barrel at the forward end of the plunger and the bushing 82 at the rearward end of the barrel, support the plunger 34 more firmly and permit a longer injection stroke without excessive bending of the shaft of the plunger 34.

Figure 6:
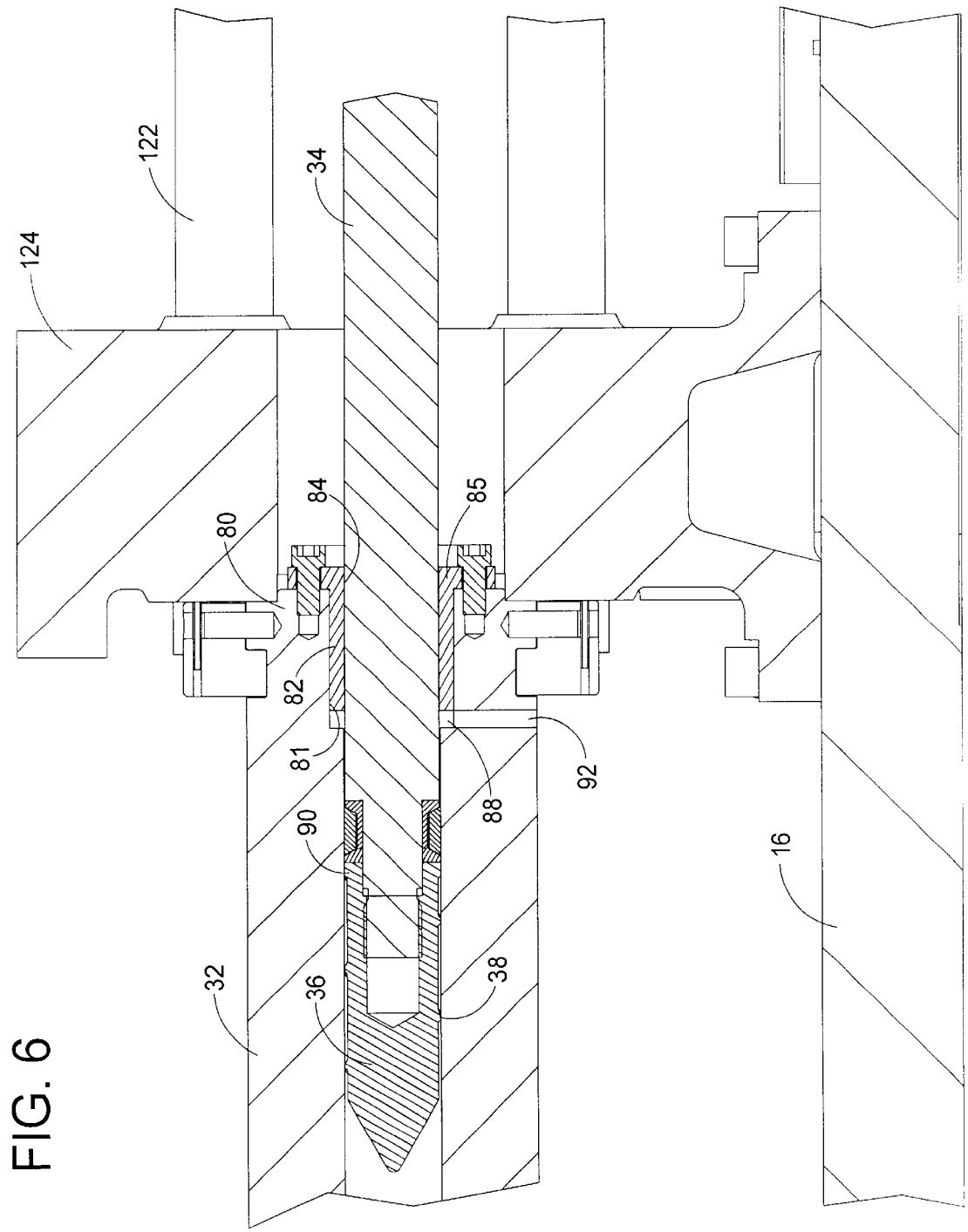
FIG. 6 is an enlarged, fragmentary, side elevational view, in cross section, showing one form of the accumulator barrel, plunger, and associated elements of the melt accumulator shown in FIG. 5.

As also shown in FIG. 6, the recess 81 in which support bushing 84 is received has a longer axial length than does the body of bushing 82. Thus, when the bushing 82 is fully inserted into the recess 81, the bushing flange 85 contacts the barrel end 80, to close that end of the barrel, and an annular gap 88 remains within the interior of the barrel 32. The annular gap 88 serves to define a collection space to receive any molding material that may have leaked past the end land 90 of the plunger head 36. A drain passageway 92 is provided through the wall of the barrel 32 to permit communication between the annular gap 88 and the exterior of the barrel 32, to allow the collected leakage molding material to flow from the barrel 32.

Figures 7, 8:
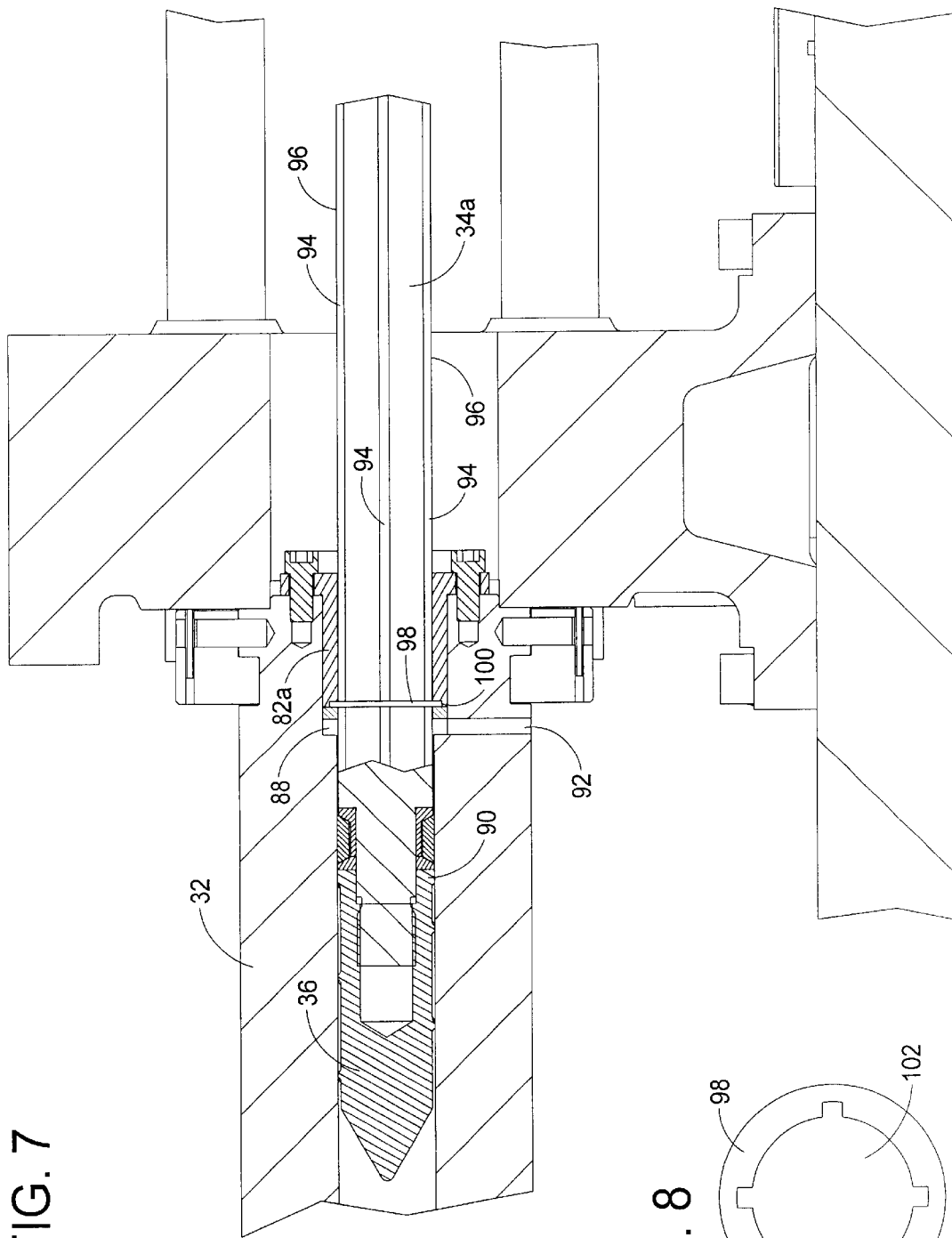
FIG. 7 is a view similar to that of FIG. 6 showing an alternative embodiment of an accumulator barrel and plunger forming part of the melt accumulator of an injection unit in accordance with the present invention.
FIG. 8 is plan view of a wiper provided as a part of the embodiment shown in FIG. 7.

A further embodiment of a plunger and barrel structure to enable higher plunger L/D's is shown in FIG. 7. As there shown, the exterior surface of the shaft of the plunger 34a behind the end land 90 of the head 36 includes a plurality of radially-extending axial ridges 94, such as the four equidistantly circumferentially spaced ridges 94 illustrated. The outer surfaces 96 of the ridges 94 contact the inner wall of the barrel 32 and also the inner surface of the bushing 82a, to provide lateral support for the plunger 34a during an injection stroke. The illustrated structure is a spline-like shaft portion of the plunger 34a, and the number of radial ridges 94 can be varied from the four ridges shown, if desired, to three ridges or to more than four ridges.

To prevent the leakage of molding material out of the rear end 80 of the barrel 32, an annular wiper 98 is provided within the barrel 32 and surrounding the plunger 34a. As shown in FIG. 8, the wiper 98 is in the form of an annular ring or washer that is received in an undercut 100 formed in the innermost end of bushing 82a. An inner opening 102 in the wiper 98 is configured so that wiper 98 surrounds and closely engages the outer surfaces of the plunger 34a. The wiper 98 is made to slide relative to the plunger outer surface when the plunger 34a is retracted from the barrel 32 as molding material is received within the barrel, and also to slide relative to the plunger outer surface as the plunger moves inwardly into the barrel 32 during an injection stroke.

The wiper 98 thereby serves as a dam to confine leakage molding material within the annular recess 88 in the barrel 32 and to enable that leakage material to flow through drain passageway 92.

Figure 9:
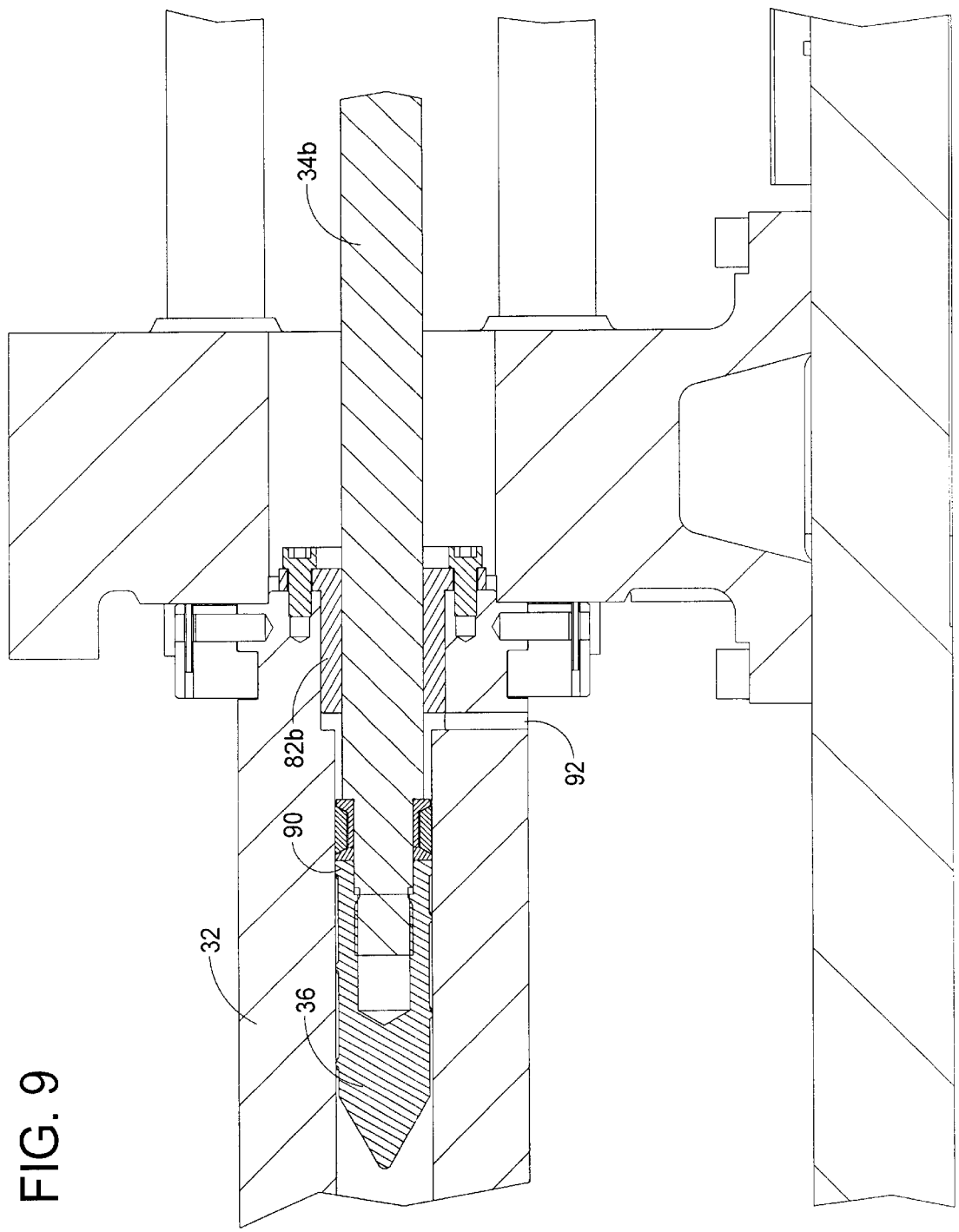
FIG. 9 is a view similar to that of FIG. 6 showing another embodiment of an accumulator barrel and plunger forming part of the melt accumulator of an injection unit in accordance with the present invention.

Another embodiment of a plunger and barrel structure is shown in FIG. 9. The plunger 34b in that embodiment has a smaller plunger shaft diameter than that of the plunger head 36 that includes the flight 38 and end land 90. The plunger 34b can be most effectively used in instances wherein the plunger head diameter is about 2.4 in or larger, a size for which possible bending of the slightly smaller diameter plunger shaft under axial loading is less of a problem than it is for smaller diameter plungers. The plunger 34b in this embodiment is supported within the barrel 32 at its head 36 and at the bushing 82b. As with the embodiments of FIGS. 6 and 7, leakage material is collected in the recess 88 and can flow from the barrel 32 through the drain passageway 92.

As discussed previously, for large shot sizes, over about 80 oz. of molding material for example, a longer injection stroke is required to provide the necessary volume of molding material for filling larger mold cavities. Accordingly, when the necessary volume of molding material has been accumulated in the barrel a substantial portion of the plunger shaft extends outwardly beyond the end of the accumulator barrel. When torque is applied to the roller screw to drive the plunger toward the mold cavity during the injection stroke, the axial (column) load exerted on the plunger by the screw must be carefully controlled in order not to cause excessive lateral deflection of the plunger. Consequently, when the stroke of the plunger is such that the plunger shaft extends considerably beyond the end of the accumulator barrel, the plunger shaft is not well supported, as it would be with a shorter plunger stroke. In such situations, the maximum injection pressure cannot be applied to the fully retracted plunger without the possibility of excessive bending of the plunger shaft. An approximation to the amount of transverse deflection or bending of the plunger can be made using the well-known Euler column formula.

To avoid excessive lateral deflection of the plunger during the initial inward motion of the plunger shaft, particularly at a time when the unsupported length of the plunger shaft is greatest, the initial axial column loading and the resultant melt injection pressure must be maintained at a sufficiently low level. The applied force can be gradually increased as the unsupported length of the plunger shaft decreases, thereby maximizing the axial load that can be imposed on the plunger shaft by the screw without excessive lateral deflection during the injection stroke of the plunger. In other words, as the unsupported column length of the plunger is shortened, the melt injection pressure can be gradually increased until the unsupported column length has diminished sufficiently to avoid bending problems when the desired injection pressure is applied to the material to be injected.

Figure 10A:
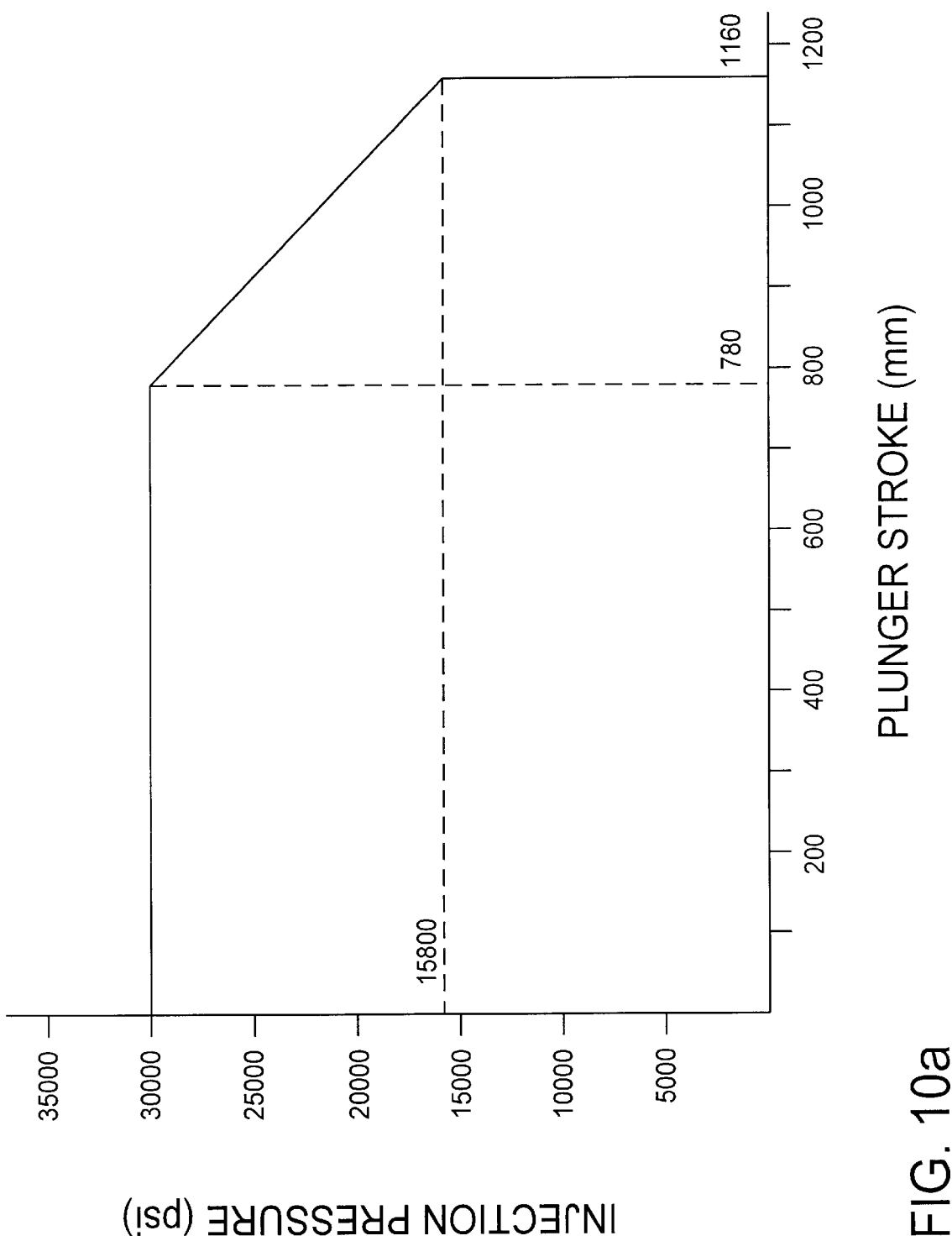
FIGS. 10a, 10b, and 10c are graphs showing the injection pressure during an injection stroke as a function of the plunger position for melt accumulators having various shot capacities.

FIG. 10a is a graph showing a plot of injection pressure of the molding material as a function of the position within the accumulator barrel of the forward end of the plunger. The values shown are applicable to the injection of an 80 oz. shot of molding material using a 99 mm. diameter roller screw connected with a cylindrical plunger having an outer diameter of 52 mm. The stroke length scale begins at zero at the inner surface at the material outlet end of the accumulator barrel and extends to the outermost point of the forward end of the plunger when it is fully retracted at 1160 mm from the material outlet end of the accumulator barrel. As shown, the initial injection pressure at the commencement of the injection stroke is 15,800 psi. The injection pressure is increased substantially linearly to 30,000 psi to the point (780 mm) at which the injection stroke length is about one-third of full stroke length. At that point the unsupported column length of the plunger and the roller screw has decreased sufficiently so that the injection pressure can proceed at the desired 30,000 psi level.

Figure 10B:
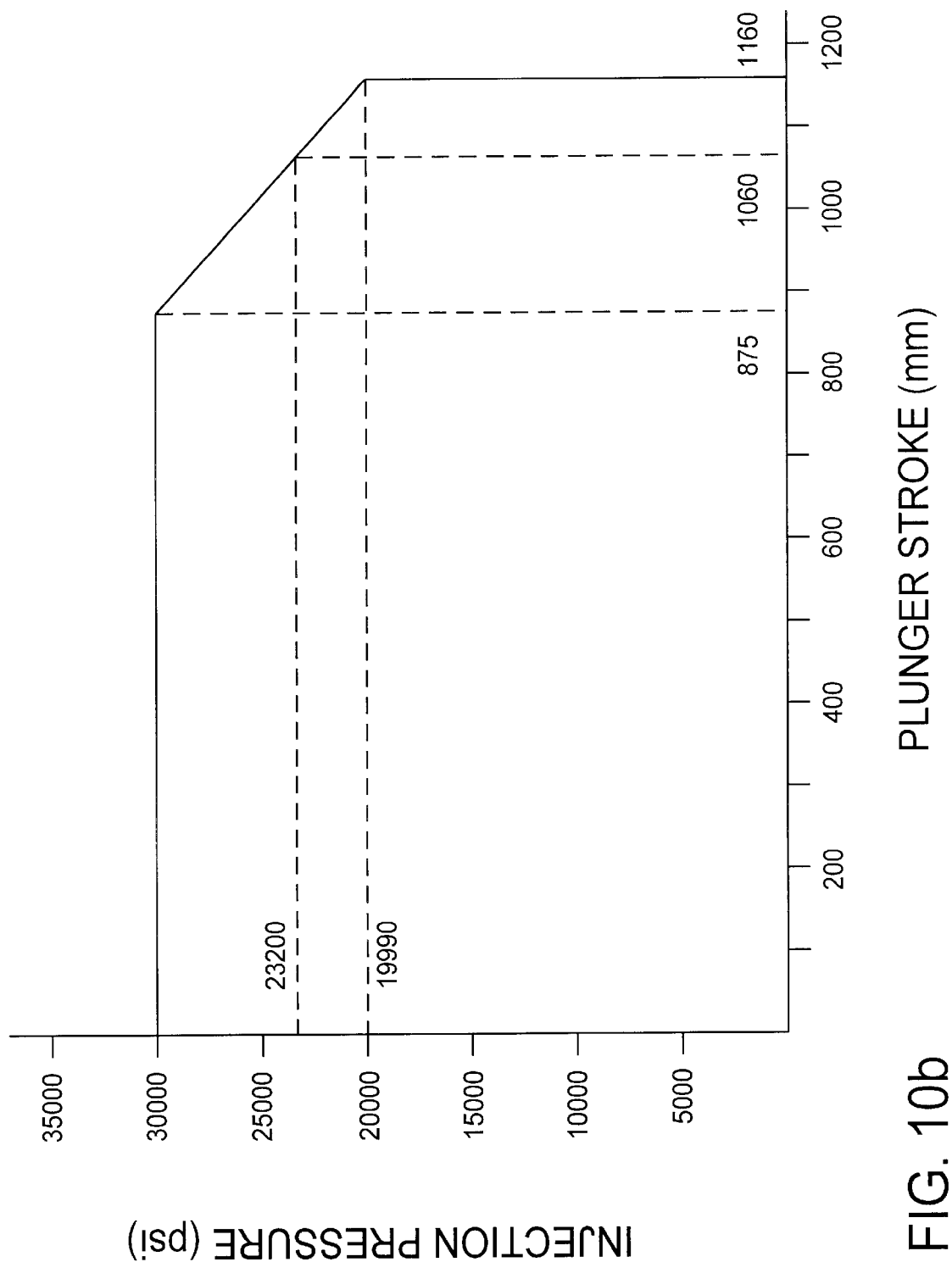

FIG. 10b is similar to FIG. 10a except that it reflects a shot size of 110 oz. The injection pressure is initially 19,990 psi and is gradually increased to 23,200 psi as the plunger reaches 8.6% of its full stroke (1060 mm) with a roller screw having a diameter of 99 mm and a plunger having a diameter of 60 mm. Thereafter the injection pressure can proceed at the desired 23,200 psi level to the completion of the injection stroke. As shown by the uppermost line in FIG. 10b, when a roller screw having a diameter of 120 mm is employed with a plunger having a diameter of 60 mm, the injection pressure can be gradually increased to a desired higher level of 30,000 psi at a point at which the plunger has traversed about 24.6% of its stroke (875 mm), after which the injection pressure remains constant at the desired higher level until the full shot of material has been injected.

Figure 10C:
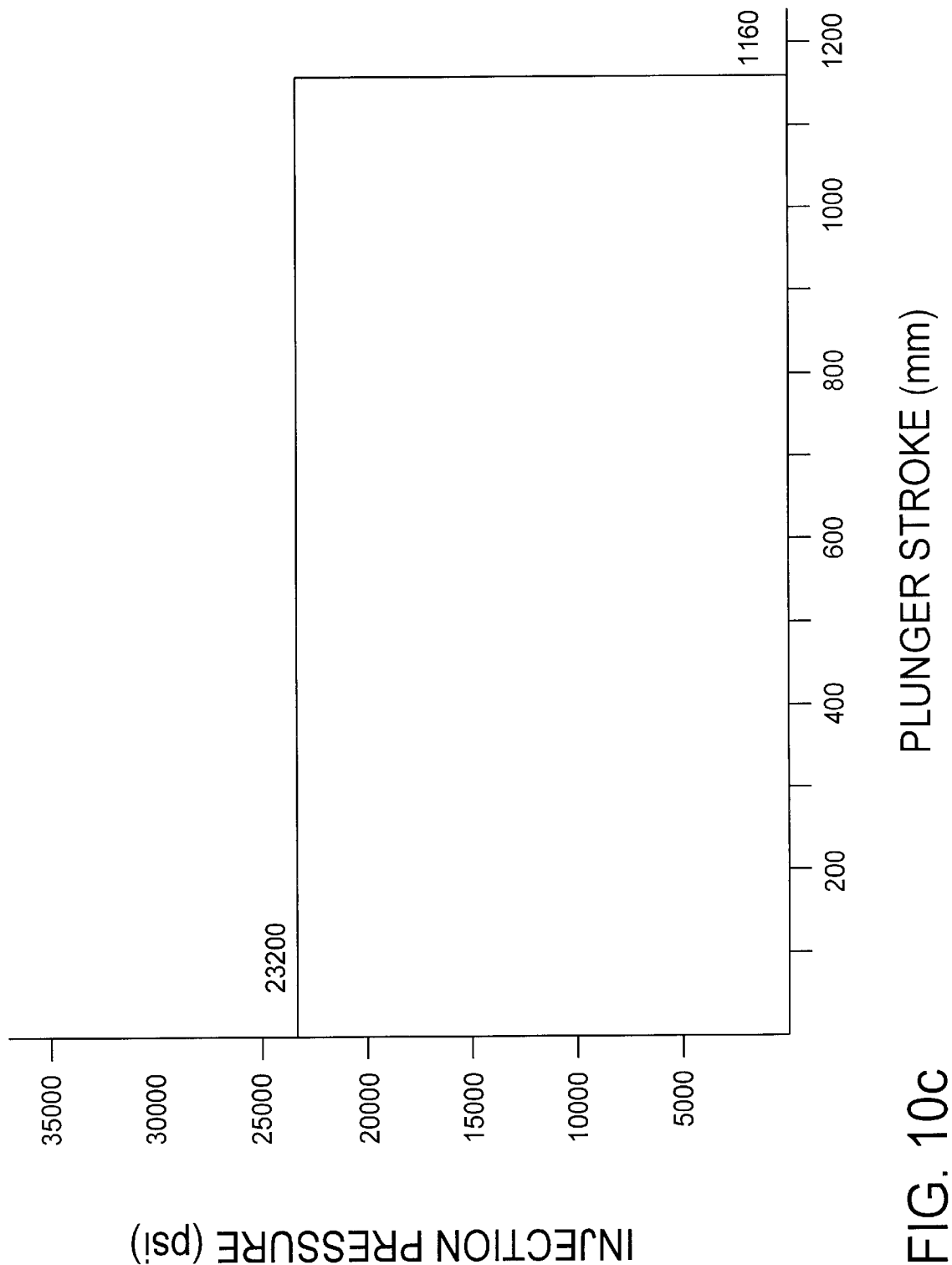

FIG. 10c is similar to FIGS. 10a and 10b but reflects a shot size of 150 oz, a roller screw having a diameter of 120 mm, and a plunger having a diameter of 70 mm. Because of the larger plunger diameter, the column-loading-induced lateral deflection and the resultant bending stress on the plunger are lower, and therefore the injection pressure can reach its desired full value of 23, 200 psi immediately, without the need for a gradual increase in injection pressure as shown in FIGS. 10a and 10b for the other structural embodiments.

For accumulator constructions where the L/D is particularly high, perhaps exceeding twenty-five, additional lateral support for the plunger 34 is desirable in order to minimize lateral deflection of the plunger shaft, relative to its longitudinal axis, caused by the axial loading imposed during the injection stroke. One way to provide additional lateral support is by an intermediate support member that contacts the plunger shaft at a point spaced rearwardly of the end of the accumulator barrel to provide lateral support. One could provide a fixed intermediate support at a fixed spacing from the rearward end of the barrel, but to provide lateral support in that manner could limit the length of the injection stroke to an undesirable degree. However, a movable intermediate support would not unduly limit the length of the injection stroke.

One form of movable intermediate support member that enables very high plunger L/D's, is shown in FIGS. 11 and 12. A movable support plate 120 is slidably carried on a plurality of parallel guide rods 122, of which four are shown disposed in a rectangular array in FIG. 12. More or fewer such guide rods can be provided, if desired, as it is not absolutely necessary that four guide rods be utilized. The guide rods 122 extend between and are fixedly connected with the stationary platen 124 and with the roller nut support housing 66, which are secured to and carried on the base 16. The support housing 66 carries the roller nut 64 in fixed relationship therewith, and the nut 64 receives and rotatably engages the roller screw 62. Also slidably carried on the guide rods 122 is a movable traverse platen 126, which is slidably connected with the movable support plate 120 by the connecting rods 128 so that the plate 120 is spaced from the platen 126, when the plunger 34 is retracted, as shown.

During the injection stroke, the support plate 120 moves together with the platen 126 along the guide rods 122 in the same direction and at the same velocity until it reaches a stopping point adjacent the stationary platen 124. As the platen 126 moves forward to complete the stroke, the rods 128 slide through the platen 126 until the injection stroke is complete. Adjustment nuts 130 are threadedly engaged with connecting rods 128 to enable adjustment of the spacing between the support plate 120 and the traverse platen 126. When the platen 126 moves to the rear as the accumulator 20 refills, it slides along the rods 128 until it contacts the nuts 130; at this point, the support plate 120 is carried back with the platen 126 to the full stroke position.

The plunger 34 and the roller screw 62 are connected with each other through the one-way clutch 86, as described previously. Consequently, when the roller screw 62 is rotated to advance the plunger 34 toward a mold (not shown), to the left as viewed in FIG. 12, the support plate 120 slidably receives and continuously supports the plunger 34 to shorten the unsupported length of the plunger 34, thereby allowing a higher injection pressure, without excessive lateral deflection of the plunger, than could be achieved were such an intermediate support member not provided.

If desired, the support plate 120 and the traverse platen 126 can be supported vertically to prevent their weight from deflecting guide rods 122 and thereby allow the use of smaller diameter guide rods. The lowermost surfaces of each of the support plate 120 and the traverse platen 126 can be configured to ride on a suitable guide surface 132, as is provided for the support platen 69. The guide surface 132 can be a smooth, flat surface or one or more machine ways of the type that is well-known to those skilled in the art. Optionally, guide surface 132 can be formed by a ball bearing linear track, such as that made and sold under the name "THK Linear Motion Systems," by THK Co., Ltd., of Japan.

Figure 14:
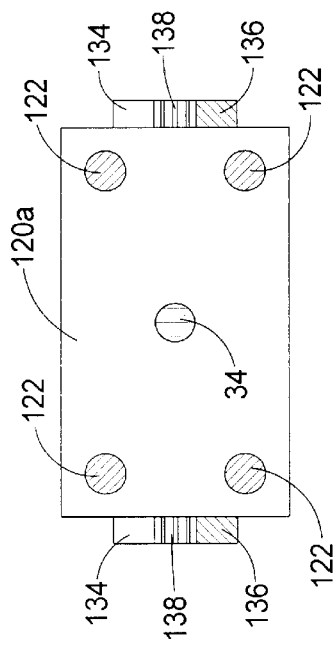
FIG. 14 shows the plunger support plate of the embodiment shown in FIG. 13, as viewed along the line 14—14 of FIG. 13.
Figure 13:
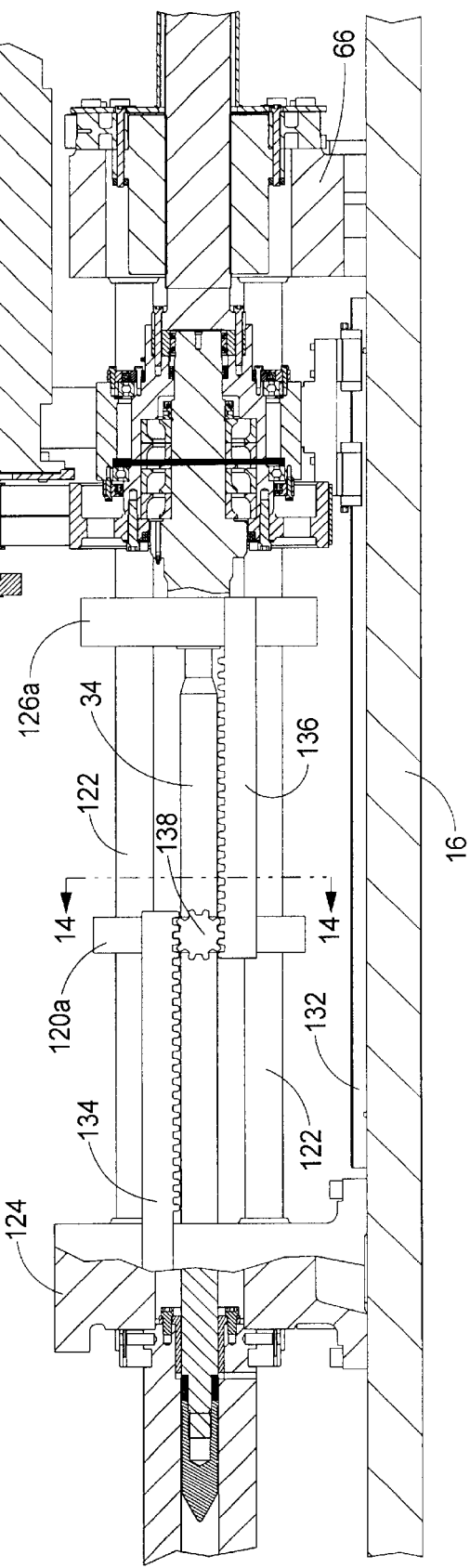
FIG. 13 is a fragmentary, side elevational view, partially in cross section, of a further embodiment also including a plunger support plate, but one that moves at a different speed than the traverse platen.

Another embodiment of a plunger intermediate support arrangement to enable a longer plunger injection stroke to be employed is shown in FIGS. 13 and 14. This arrangement is similar to that of FIGS. 11 and 12 in that an intermediate support plate 120a is provided between the stationary platen 124 and the traverse platen 126a to provide additional support for that portion of the plunger 34 that extends outwardly of the barrel 32. However, instead of the limited adjustment provided by connecting rods 128 that extend between the support plate 120 and the traverse platen 126 in the embodiment shown in FIGS. 11 and 12, the embodiment of FIGS. 13 and 14 maintains the position of the support plate 120a half way between the stationary platen 124 and the traverse platen 126a. As viewed in FIG. 13, when the plunger 34 is shifted to the left to effect an injection stroke, the spacing between the support plate 120a and the traverse platen 126a diminishes to allow a longer injection stroke than is attainable with the embodiment of FIGS. 11 and 12, and to maintain a proportionally spaced, moving intermediate vertical support for the plunger 34. In the arrangement shown in FIGS. 13 and 14, the support plate 120a essentially moves at half the speed of the traverse platen 126a during the course of an injection stroke of the plunger 34.

Referring once again to FIGS. 13 and 14, the stationary platen 124 fixedly carries a pair of laterally-spaced racks 134 that extend toward the traverse platen 126a, on opposite sides of the plunger 34, and parallel with the guide rods 122 to form part of a rack-and-pinion drive system for the support plate 120a. Similarly, the traverse platen 126a fixedly carries a pair of laterally-spaced racks 136 that extend toward the stationary platen 124, on opposite sides of the plunger 34, and parallel with the guide rods 122 to also form part of a rack-and-pinion drive system for the support plate 120a. As best seen in FIG. 14, the racks 134, 136 are laterally offset from each other so that they each engage diametrically opposite teeth on the periphery of respective pinion gears 138 that are rotatably carried on respective opposite sides of the support plate 120a. Although shown in FIG. 13 as unsupported at their respective outermost ends, the racks 134, 136 can, if desired, be slidably carried in slots (not shown) formed in the support plate 120a, or they can be otherwise supported, as will be appreciated by those skilled in the art.

In operation of the embodiment shown in FIGS. 13 and 14, movement of the traverse platen 126a causes the traverse platen racks 136 to rotate the respective pinion gears 138. By virtue of the engagement of the gears 138 and stationary platen racks 134, the gears 138 move along the racks 134, 136 toward or away from the stationary platen 124, depending upon the direction of movement of the traverse platen 126a. The relative movement, or closure speed, of the support plate 120a toward or away from the traverse platen 126a is half of that imparted to the traverse platen 126a. Thus the support plate 120a moves half the distance of the traverse platen 126a, maintaining the desired intermediate support for the plunger 34.

While the invention has been illustrated in some detail according to the preferred embodiments shown in the accompanying drawings, and while the preferred embodiments have been described in some detail, there is no intention to limit the invention to such detail. On contrary, it is intended to cover all modifications, alterations, and equivalents falling within the scope of the appended claims. For example, although the foregoing description focused on the advantages associated with larger shot capacities, the two stage construction of the present invention is equally applicable to injection units having a relatively small capacity, but still having a relatively high L/D. In addition, a variety of systems or mechanisms can be used to impart linear motion to the accumulator the plunger 34; such as, a rack and pinion, a ball screw and nut, or a roller screw and nut, as described. Alternatively, a suitably configured linear (electric) motor can be used to actuate the plunger 34 directly.

What is claimed is:

1. A method of supplying molding material to a mold cavity under pressure by means of an injection system that includes (i) a plastication barrel, (ii) a tubular accumulator barrel separate from the plastication barrel, the accumulator barrel having an inlet that communicates with the plastication barrel and outlet that communicates with the mold cavity, the inlet and outlet being adjacent the same end of the accumulator barrel, and (iii) a plunger positioned within the accumulator barrel for axial sliding movement, the plunger having a head portion with an external helical ridge at the forward end of the plunger, said method comprising the steps of:

a. plasticating a quantity of molding material in the plastication barrel;

b. conveying the plasticated molding material from the plastication barrel to the inlet of the tubular accumulator barrel with the plunger fully advanced, such that the molding material initially entering into the accumulator barrel passes over the head portion of the plunger and travels along the external helical ridge, carrying with it any residual molding material on the plunger head toward the outlet, c. simultaneously rotating and retracting the plunger as the molding material is conveyed into the accumulator, so that after the plunger has retracted a given distance, subsequent molding material enters the inlet in front of the plunger without passing over the plunger head, wherein the rotation and retraction of the plunger are effected by an electric-motor-powered drive system, d. advancing the plunger during an injection stroke to inject the molding material through the outlet of the accumulator barrel and into the mold cavity at a predetermined injection pressure, wherein advancing the plunger is effected by the electric-motor-powered drive system.

2. A method in accordance with claim 1, wherein the drive system includes a screw driven by an electric motor and coupled with the plunger through a one-way clutch to allow rotation of the plunger in only one direction.

3. A method in accordance with claim 2, including the step of supporting a portion of the plunger that extends outwardly of the accumulator barrel and at a position between the plunger drive system and the accumulator barrel with a support member to minimize bending of the plunger during an injection stroke.

4. A method in accordance with claim 3, wherein the support member moves relative to the plunger during an injection stroke.

5. A method in accordance with claim 1, including the step of varying the injection pressure from a first injection pressure during commencement of the injection stroke to a second injection pressure after the plunger has traveled a predetermined axial distance into the accumulator barrel, wherein the second injection pressure is higher than the first injection pressure.

6. A method in accordance with claim 5, including the step of substantially linearly varying the injection pressure between the first injection pressure and the second injection pressure.

* * * * *